United States Patent
Boyce et al.

(10) Patent No.: US 6,498,771 B1
(45) Date of Patent: Dec. 24, 2002

(54) DATA STORAGE UNIT HAVING PLURAL REMOVABLE MAGAZINES

(76) Inventors: Leslie Graham Boyce, 37 Midford Lane, Limpley Stoke, Bath, Wiltshire, BA3 6JS (GB); Charles William Donkin, Rectory Cottage, Dinder, Wells, Somerset, BA5 3PL (GB); Duke Rollo Ebenezer, Westfield House, Bath Road, Wells, Somerset, BA5 3DH (GB); Edward Farr, 17 Mountbatten Close, Weston-super-Mare, Somerset, BS22 9LR (GB); Brian Kenneth Hext, 4 High Street, Wookey, Wells, Somerset, BA5 1JZ (GB)

(*) Notice: Subject to any disclaimer, the term of this patent is extended or adjusted under 35 U.S.C. 154(b) by 39 days.

(21) Appl. No.: 09/588,217

(22) Filed: Jun. 6, 2000

(30) Foreign Application Priority Data

Jun. 10, 1999 (GB) .............................................. 9913460

(51) Int. Cl.[7] .......................... G11B 17/22; G11B 15/68
(52) U.S. Cl. ................................ 369/30.34; 369/34.01; 369/36.01; 360/92
(58) Field of Search ........................... 369/34.01, 30.38, 369/30.06, 30.2, 30.34, 30.31, 30.49, 36.01, 38.01; 360/92

(56) References Cited

U.S. PATENT DOCUMENTS

| | | | |
|---|---|---|---|
| 4,737,945 A | | 4/1988 | Yamazaki et al. |
| 4,815,056 A | * | 3/1989 | Toi et al. ........................ 369/36 |
| 4,878,137 A | * | 10/1989 | Yamashita et al. ........ 360/98.05 |
| 4,912,575 A | * | 3/1990 | Shiosaki ........................ 360/71 |
| 5,036,503 A | * | 7/1991 | Tomita ........................ 369/36 |
| 5,293,284 A | | 3/1994 | Sato et al. |
| 5,666,337 A | | 9/1997 | Dang et al. |
| 5,883,864 A | * | 3/1999 | Saliba .......................... 369/30 |

FOREIGN PATENT DOCUMENTS

| | | |
|---|---|---|
| GB | 2 126 004 | 3/1984 |
| GB | 2 221 340 | 1/1990 |
| WO | 95/28708 | 10/1995 |

* cited by examiner

Primary Examiner—Tan Dinh
(74) Attorney, Agent, or Firm—Morrison & Foerster LL

(57) ABSTRACT

Data storage units (1) for storing a plurality of individual data storage media (12), the units comprising at least one removable magazine (9, 10) in which the individual data storage media (12) can be stored within the units (1), the magazines (9, 10) being removable from the front of the units (1). At least one drive (5, 6) which reads data from or writes data to individual data storage media (12) is positioned relative to the magazine(s) (9, 10) so that the storage media (12) are fed therein and removed therefrom in a direction substantially perpendicular to the direction in which the media are removed from the magazine(s) (5, 6). A selector (20) facilitates the selective removal of media (12) from the magazines (9, 10) in which they are stored, and feeds them into the drive (5, 6), and vice versa.

13 Claims, 7 Drawing Sheets

DATA STORAGE UNIT HAVING PLURAL REMOVABLE MAGAZINES

FIELD OF THE INVENTION

This invention concerns data storage and more particularly apparatus for storing a plurality of individual data storage media and reading data therefrom, the data being stored by the individual storage media, for example in magnetic or optically readable form.

BACKGROUND TO THE INVENTION

So-called libraries in which data is stored in magnetic or optical form on a plurality of individual data storage media which can be selectively fed to an appropriate reader of the data are well known in the art. Particular data storage media which have been used include magnetic tape cartridges and cassettes, tape spools, magnetic storage discs, and data stored in optically readable form, for example on a storage disc.

In general, such libraries store the media in racks, drums or magazines, or on shelves, from which individual media can be extracted by a transport mechanism which conveys them to a data drive where data is read from or written to them, to other positions within the library, or even to another library.

Unlike conventional libraries for housing books, which fill rooms, magnetic and optical storage media for libraries of the type described are frequently stored in units which are of a size such that they fit within standard 19 inch (482.6 mm) racking systems, a separate computer being used to control the functioning of these units. In addition, space constraints usually dictate that these units also have as small a height as possible based on increments of 1.75 inches (44.45 mm), which is generally the standard height increment for racking systems. There is therefore a desire for storage units which are to be housed within such racking systems to provide storage space for as many individual storage media as possible but also in the smallest rack height possible. Furthermore, such storage units need to house a transport mechanism for transporting individual media within the unit itself, or to another storage unit, and especially to a data drive within the unit. In general they also have to house the data drives and a power supply for the storage unit.

Yet further equipment is usually included within these storage units, for example cooling fans and devices for identifying individual media within them, e.g. bar code readers for reading bar codes on the individual media. Devices for identifying the individual media are usually required in order that the transport mechanism can select and move the correct medium. This is clearly essential if the individual storage media are arbitrarily loaded by hand into vacant positions within the library, and it is highly desirable even where this is not the case in order that control of the positioning and movement of the media within the storage units can be satisfactorily monitored. This can be particularly desirable where media can be exchanged between adjacent storage units.

Libraries including the above elements are known in the art, but the storage arrangements for the individual media tend to be inconvenient. For example, in one such arrangement a row of magnetic tape cartridges is housed vertically across the width of the front of the library constructed to fit a standard 19 inch rack, with an incomplete second row being positioned rearwardly of the first row, the second row containing a drive for reading individual cartridges fed into it by a transport mechanism, the latter, which removes and returns individual cartridges from their storage positions in the racks and feeds them into and removes them from the drive, running on a track between the first and second rows. The transport mechanism is controlled to move along the track to a position on the track where a selected cartridge is to be removed from either the first or the second row. A drive mechanism on the transport mechanism then slides a selected cartridge in the appropriate direction from the row where it is stored and on to the transport mechanism. Thereafter, the transport mechanism is moved along the track to a position where the cartridge can be pushed by the drive mechanism into the drive. Changing cartridges is then the reverse of this process.

As will be appreciated, it is possible to arrange for all of the cartridges in the first row to be removed from the library by having them stored in a suitable carrier which could itself be loaded into it from the front of the machine. However, access to the second row of cartridges is much more difficult because it is on the opposite side of the track from the transport mechanism. The result is that rather than change the cartridges in the second row by reaching into the apparatus to gain access to them, all of the cartridges in both the front and second rows are changed by feeding them in an out of an access slot in the front of the machine. Although this avoids the problems with direct physical access to the second row, it seriously restricts the speed with which the cartridges can be changed as they all have to be fed in and removed one at a time through the same access port.

SUMMARY OF THE INVENTION

According to the present invention there is provided data storage units for storing a plurality of individual data storage media, the units comprising at least one removable magazine in which the individual data storage media can be stored within the units, the magazine being removable from the front of the units; at least one drive means for reading data from or writing data to individual data storage media, the drive means being positioned relative to the magazine(s) so that the storage media are fed therein and removed therefrom in a direction substantially perpendicular to the direction in which the media are removed from the magazine(s); and selector means for selectively removing media from the magazine in which they are stored, and feeding them into the drive means, and vice versa.

Data storage units in accordance with the present invention enable all of the magazines holding the data storage media within them to be inserted into and removed from the units, without the problems encountered hitherto with units in which one row of storage media is stored behind the selector mechanism, particularly if the selector means is used to remove individual data storage media from a pair of substantially parallel and opposing magazines.

Data storage units in accordance with the invention preferably include a pair of removable magazines which are substantially parallel to each other and are removable from the front of the units, the selector means being capable of selectively removing data storage media from the respective magazines and feeding them into the drive means, and vice versa, the feeding being in a direction substantially perpendicular to the direction in which the media are removed from the respective magazines. Removal of individual data storage media from either magazine by the selector means is preferably then in a direction substantially towards the other of said pair of magazines.

The individual data storage media are preferably stored substantially vertically within the magazines, and the drive means preferably receives the media for reading or writing in a substantially vertical plane. This enables a good use to be made of the space within the units, especially when they are constructed to fit into conventional 19 inch (482.6 mm) racking systems.

The units can be arranged to house a single magazine or a single pair of removable magazines. However, two or more pairs of magazines are preferably arranged in two or more layers, one magazine of each pair of magazines being positioned directly above a magazine in another pair to provide two vertical stacks, the selector means preferably being operable to select individual media from or feed individual media from the respective layers and into the drive means. This enables a large number of individual data storage media to be stored within an individual unit. For example, if each magazine can hold ten of such media, e.g. magnetic tape cartridges, one pair of magazines can store twenty of them, two pairs can store forty, and five pairs can store a hundred.

The drive means are preferably positioned within the units so that they are removable from the rear of the units. This facilitates maintenance of the units and more particularly it can avoid the necessity of removing units from racking systems to replace a drive.

Data storage units in accordance with the present invention preferably include two drives for reading data from or writing data to the data storage media for each pair of magazines. Where more than one layer of magazines is used, one or more drives can be provided for each or only some of such layers.

Although handed magazines could be used so that one only fits into a left hand aperture in the front of each unit and another only fits into a right hand aperture, it is preferable that all of the magazines are identical and interchangeable between different positions within the units.

The selector means preferably includes a reader, preferably a bar code reader, for reading identifying indicia on individual data storage media. This enables a computer to which the unit is connected to maintain an inventory of the individual media within the unit, and also to do so when two or more units are connected together and data storage media are passed between them.

If desired, data storage units in accordance with the present invention can include a cleaning device for cleaning the drive means, and the cleaning device is preferably fed into the drive means using the selector means. For example, it can be a cleaner cartridge stored within one of the removable magazines or more preferably within a dedicated position within the units themselves.

Maintenance of the inventory can be facilitated by the magazines including indicia indicative of empty storage positions therein. The reader on the selector means can then distinguish between an empty storage position and data storage media without identifying indicia.

Individual data storage units in accordance with the present invention preferably include control electronics for controlling movement of the selector means and other functions within the units even if overall control is effected by a computer terminal which provides access to the resulting library.

The present invention further provides electronic libraries comprising one or more data storage units according to the present invention which are under the control of a computer.

Where such libraries include two or more of such data storage units under the control of a computer, it is preferable to provide shuttle means which enables individual data storage media to be transferred between the individual storage units. The computer can then be arranged to maintain an inventory of where individual storage media are located within the respective data storage units.

BRIEF DESCRIPTION OF THE DRAWINGS

An embodiment of data storage unit in accordance with the present invention will now be described with reference to the accompanying diagrammatic drawings in which.

DETAILED DESCRIPTION OF THE DRAWINGS

Figure 1:
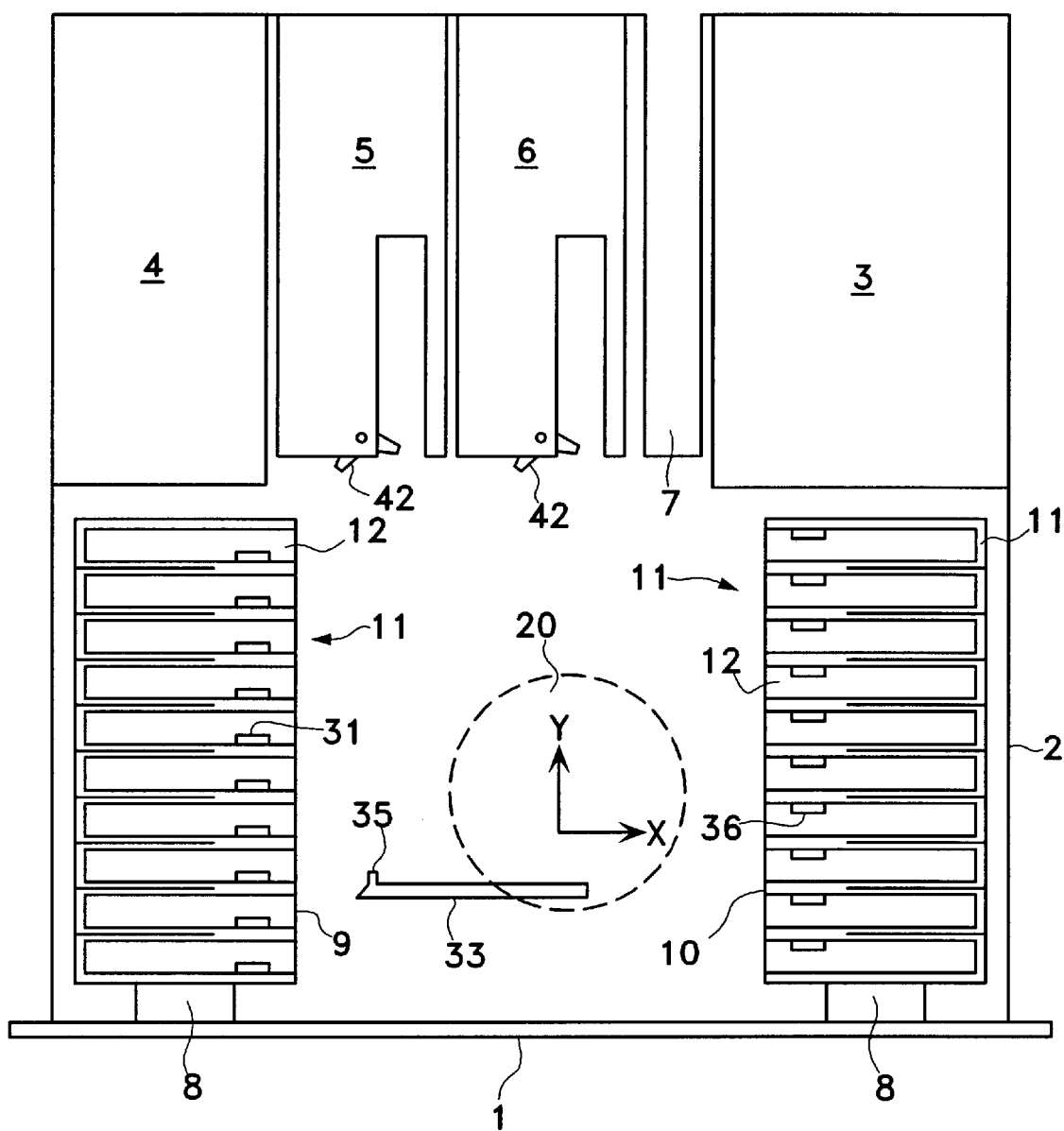
FIG. 1 is a plan view of the embodiment.

The apparatus shown in FIG. 1 is designed to be mounted in conventional manner in standard 19 inch racking using its front bezel 1 to attach it to the racking (not shown). Attached to the front bezel 1 is a chassis 2 on which are disposed various components as will be described.

In one rear corner of the chassis 2 is a power supply 3 which provides the electrical power required by the various components of the apparatus, and in the other rear corner are the electronic control circuit boards 4 which control the apparatus. Between the power supply 3 and the circuit boards 4 are two magnetic cartridge drives 5 and 6 which are both positioned to receive cartridges fed into them in a vertical plane and in a direction away from the front bezel 1. The drives 5 and 6 can read data from or record data to the magnetic tape in cartridges fed into them.

A shuttle slot 7 and associated shuttle mechanism enables cartridges to be fed to adjacent apparatus positioned vertically above or below the illustrated apparatus, as will subsequently described.

Extending along both sides from the front bezel 1 and within the chassis 2 are guides 8 for receiving two identical and removable magazines 9 and 10 each having a plurality of slots 11 for a plurality of cartridges 12, the bezel 1 having two apertures through which the magazines 9 and 10 can be slid on to the guides 8. Catches (not shown) are provided for releasably locking the magazines 9 and 10 in position on the guides 8 when the apparatus is in use.

Both ends of the magazines 9 and 10 have handles and catch actuators for facilitating removal of the magazines from the apparatus, thereby making the magazines interchangeable. Thus the magazines 9 and 10 are not handed, thereby enabling a single design of magazine to be loaded into either side of the apparatus.

In the illustrated embodiment, each magazine 9 and 10 can hold a maximum of ten cartridges, the maximum for the whole apparatus therefore being twenty cartridges. As will be appreciated, the magazines 9 and 10 can be designed to hold a different number of data storage media, for example if space considerations permit with cartridges or if different types of storage media are used. However, as will subsequently be explained, the shuttle slot 7 and the associated shuttle mechanism enable access to be obtained to similar apparatus mounted above or below the illustrated apparatus.

Mounted between the guides for the magazines 9 and 10 is a picker device shown generally at 20 in FIG. 1, the picker device 20 being movable back and forward in front of the slots 11 in the magazines 9 and 10, and positionable in front of individual slots 11 when a cartridge is to be removed from or inserted into a particular slot 11 in the magazines 9 and 10.

Figure 2:
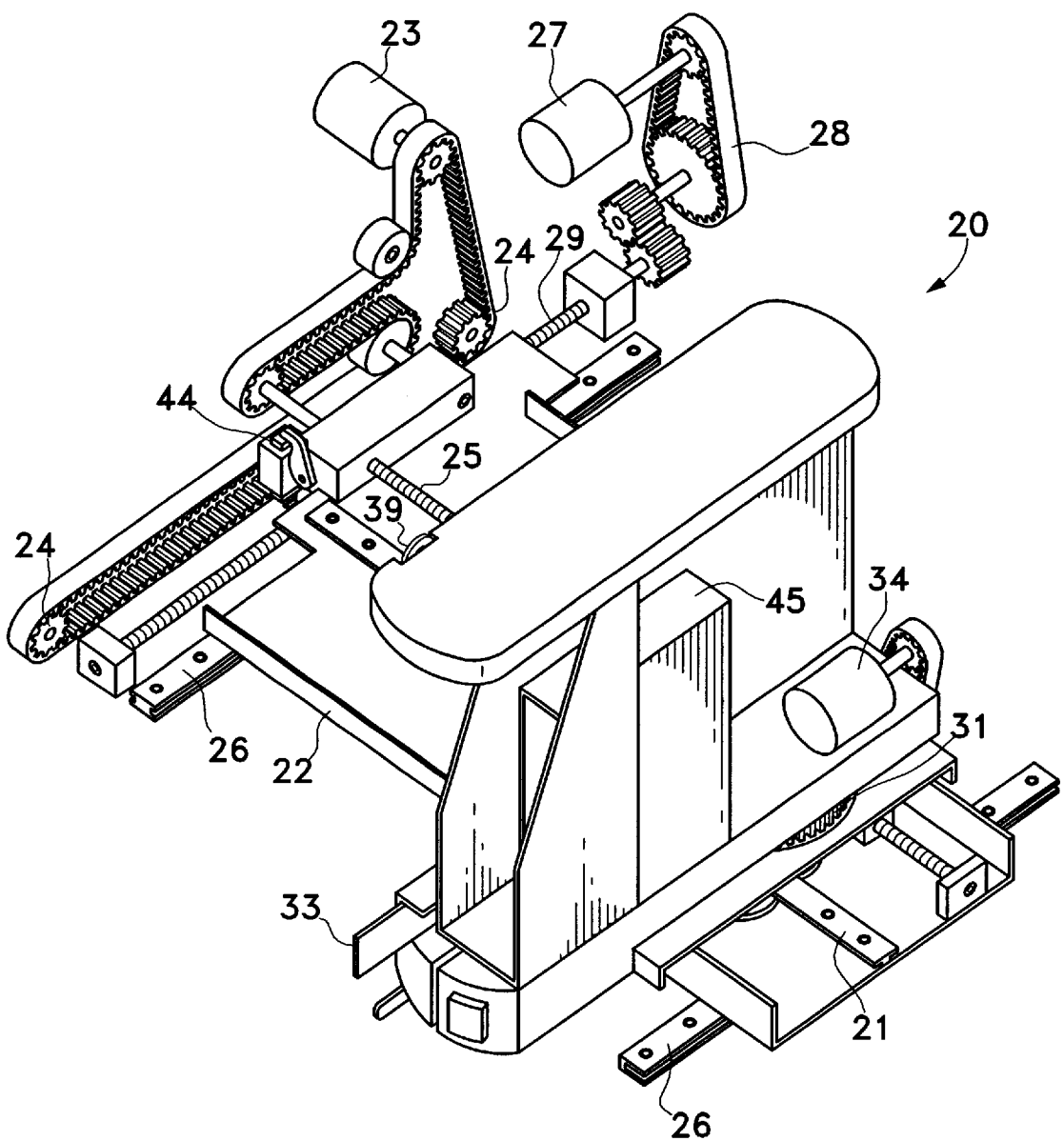
FIG. 2 is a perspective view of the picker device and associated drive mechanism of the embodiment of FIG. 1.
Figure 3:
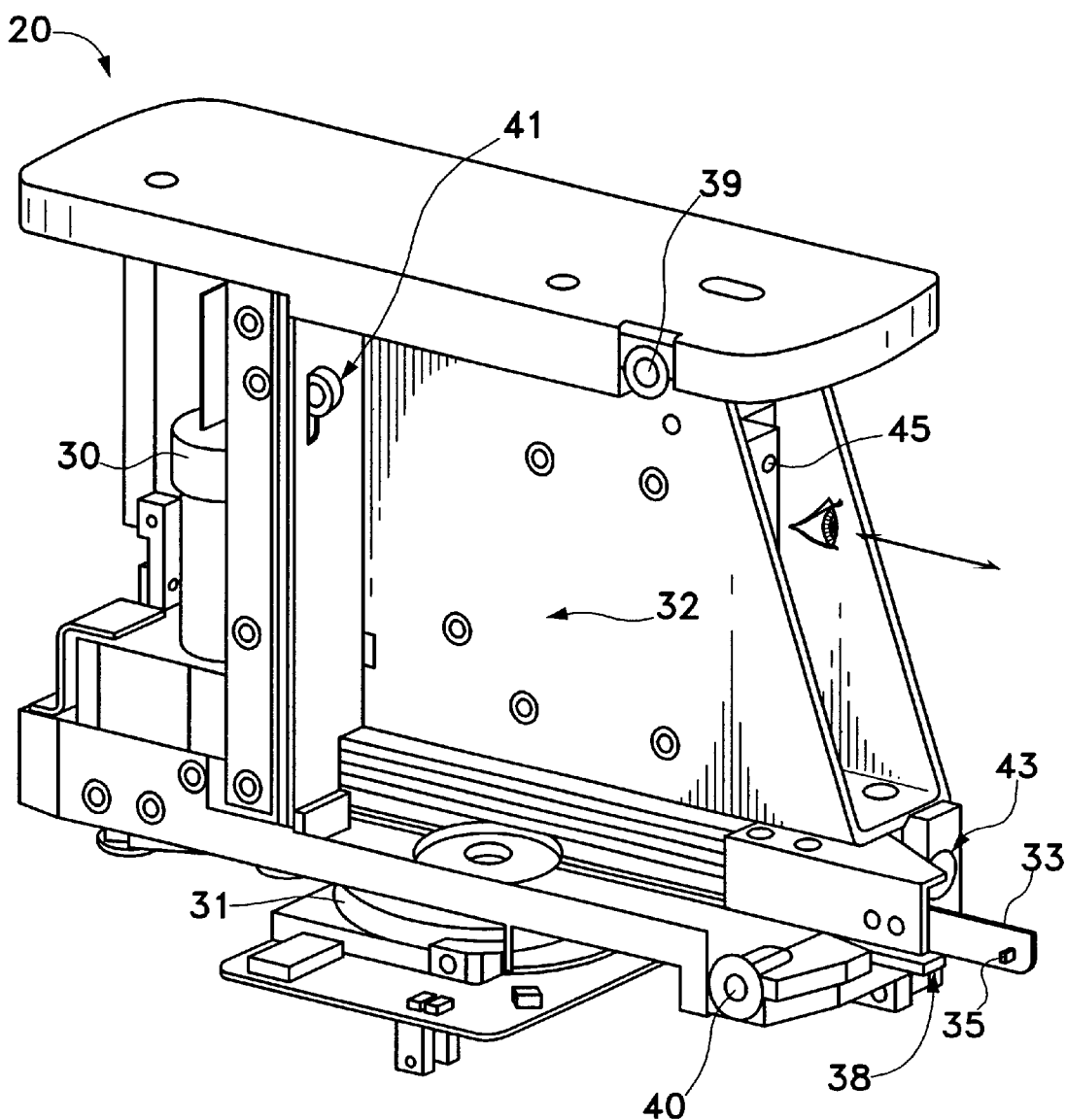
FIG. 3 is a front perspective view of the picker device of FIG. 2.
Figure 4:
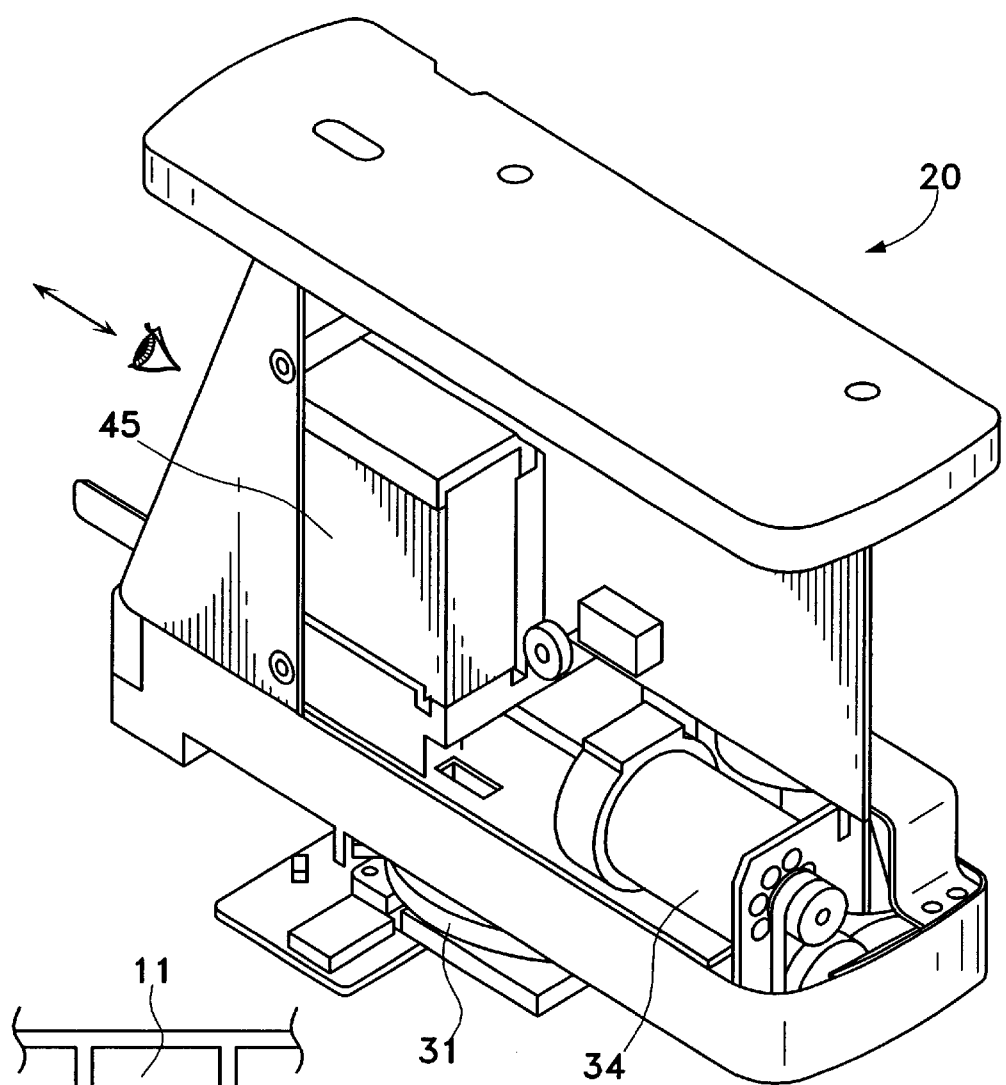
FIG. 4 is a rear perspective view of the picker device of FIG. 2.
Figure 4A:
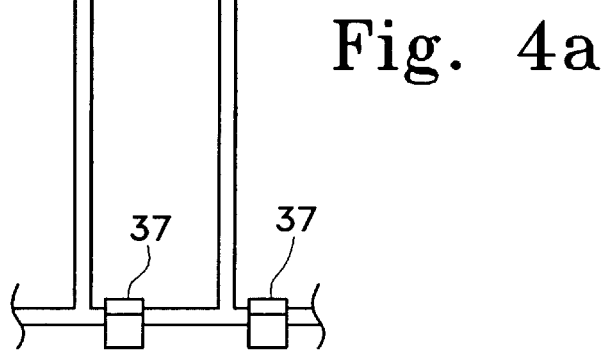
FIG. 4a is a cut away view of a portion of a cartridge magazine of the embodiment of FIG. 1.

The transport mechanism for moving the picker device 20 between the magazines 9 and 10, and the drives 5 and 6 can be seen in more detail from the perspective view of in FIG. 2. The device 20 is slidable on a track 21 which is itself mounted on a carrier 22, the position of the device 20 on the track 21 being controlled by a drive mechanism consisting of a motor 23, a drive belt and associated guide sprockets 24 which in turn drive a screwed rod 25 which moves the device 20 back and forward on the track 21. The motor 23 can therefore control the position of the device 20 relative to the various slots 11 in the magazines 9 and 10, and relative to the drives 5 and 6.

The carrier 22 is itself slidable on a pair of tracks 26, the position of the carrier 22 on the tracks 26 being controlled by a motor 27 which through a drive belt and sprocket 28 rotates a screwed rod 29 to which the carrier is connected. The motor 27 can therefore control the position of the picker device 20 relative to the magazines 9 and 10.

The two motors 23 and 27 can therefore move the picker device 20 in the "Y" and "X" directions respectively within the space between the magazines 9 and 10 and the drives 5 and 6.

In order to facilitate the removal of cartridges from or the insertion of cartridges into the slots 11 in the magazines 9 and 10, the picker device 20 is itself rotatable through 180° about a vertical axis so that cartridges can be moved out of a particular slot 11 in the opposing magazines 9 and 10 on to the picker device 20, and also so that at an intermediate angle a cartridge on the device 20 can be slid into one of the drives 5 and 6. This rotation can be effected using a motor 30 which drives a sprocket (not shown) which engages the teeth of a toothed belt 31 attached to a drum on the base of the device 20.

In order to remove a particular cartridge 12 from its slot 11, the picker device 20 is moved to the appropriate "X"–"Y" using the drive motors 23 and 27, and the associated drive mechanisms, and the device 20 is rotated using the motor 30 so that the slot 11 and a carrier slot 32 on the device 20 are aligned.

A pick 33 on the device 20 can be moved inwardly and outwardly of the device 20 using a drive motor 34 which through a toothed belt and sprockets rotates a screwed shaft to which the pick 33 is attached. In addition to being movable towards and away from the device 20, using the motor 34, the pick 33 can also be moved from side to side so that a nib 35 on the pick 33 can be moved into and out of engagement with a conventional recess 36 in the cartridges 12 when suitably positioned relative thereto.

In order to prevent the cartridges 12 falling out of the magazines 9 and 10, particularly before the latter are inserted into the apparatus, each slot 11 in the magazines 9 and 10 has a resilient catch 37 which has to be pressed down before the cartridge 12 can be removed from the slot 11. The device 20 is therefore provided with a pin 38 which is positioned to deflect the appropriate catch 37 downwardly as the pick 33 is moved towards the magazine 9 or 10 to withdraw a cartridge 12 from its slot 11. The pick 33 is then moved sideways so that the nib 35 engages the recess 36 in the cartridge 12, and the pick 33 is then retracted using the motor 30, thereby drawing the cartridge 12 into the carrier slot 32.

Movement of the cartridge 12 in the slot 32 is facilitated by upper and lower guide rollers 39 and 40, movement being continued until the cartridge 12 actuates a limit switch 41 which prevents further movement of the cartridge 12 in the slot 32.

The picker device 20 is then moved on the tracks 26 away from the magazine 9 or 10 from which the cartridge has been removed using the motor 27, and the device 20 is also rotated through 90° using the motor 30. The cartridge on the device 20 can thereby be brought into alignment with the respective entrance slots of the drives 5 and 6 into which the cartridge is to be inserted, and it can also be brought to a position where insertion into the drive can take place using the motor 27 to slide the device 20 along the track 21.

The pick 33 can then be moved out relative to the picker device 20 using the motor 30 to slide the cartridge 12 into the selected drive 5 or 6. In so doing, the device 20 actuates a lever 42 on the front of each of the drives 5 and 6 to provide a signal to the control circuitry indicative of the particular drive 5 or 6 being occupied by a cartridge. An electrically actuatable nudger pad 43 on the picker device 20 also serves to provide the cartridge with a final push to ensure that it is fully inserted into the drives 5 and 6.

Unloading of the cartridge from the drives 5 and 6 is in essence the reverse of the above loading steps. However, in order to remove a cartridge from the drives 5 and 6, a catch (not shown) preventing removal of the cartridge therefrom has first to be activated, this being effected by an actuator 44 on the carrier 22. With the catch for the drive 5 or 6 depressed, the pick 33 can slide the cartridge out of the drive and onto the slide 32 of the device 20, and in so doing actuate the lever 42 to indicate that the drive in question is now vacant, and the cartridge can then be loaded into a vacant slot 11 in either of the magazines 9 and 10.

As will be appreciated, not only can a cartridge which has been removed from a drive be returned to the slot 11 in the magazine 9 or 10 from which it was originally removed, it can be inserted into another position within the library, the computer to which the illustrated apparatus is connected maintaining an inventory of which particular cartridge is located in which particular position within the magazines 9 and 10.

Maintenance of an inventory of cartridges within the magazines 9 and 10, that is their content and position within them, is important in order to ensure that the picker device 20 selects the correct cartridge and the correct data is as a result read from or written to the drives 5 and 6. In the present embodiment this is effected by the use of a bar code reader 45 on the picker device 20 which can read bar codes on the cartridges in the magazines 9 and 10. Each of the empty slots in the magazines 9 and 10 is also provided with a bar code which is unique to empty slots, this making it is easy to distinguish between an empty slot and a cartridge with no bar code, and between empty slots and slots containing a cartridge. The bar code on a cartridge, however, can be used to identify the particular cartridge, and thereby the data stored on it.

As will also be appreciated, instead of, or possibly in addition to, having a plurality of library units as illustrated with reference to FIG. 1, the apparatus can include more than one level of magazines of cartridges. The picker device 20 then has not only to move forwards, backwards and from side to side, in addition to being able to rotate through 180°, it has to be able to move vertically up and down so that it can gain access to cartridge slots on different levels within the apparatus.

Figure 5:
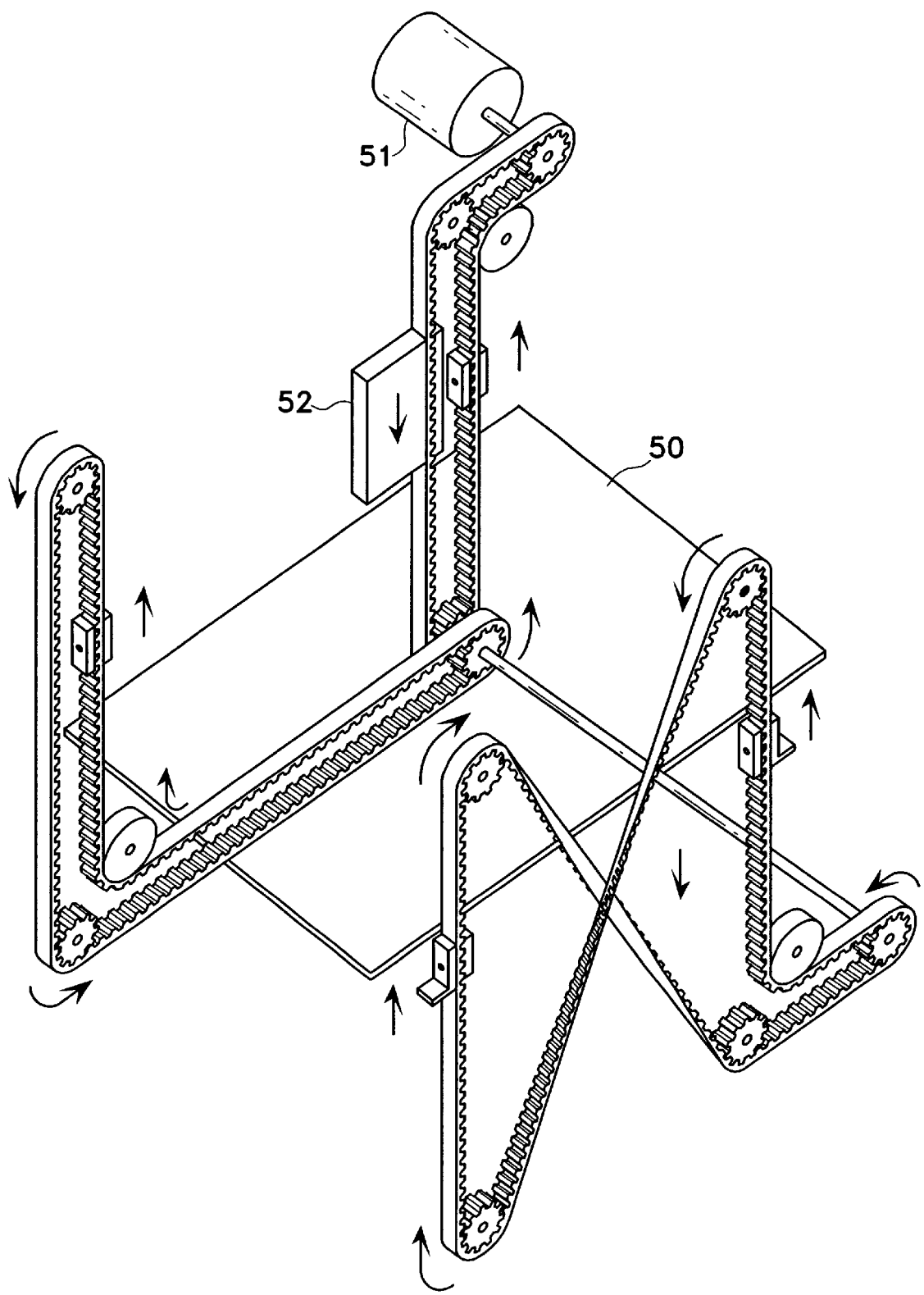
FIG. 5 is a perspective view of a first embodiment of drive mechanism for moving the drive mechanism of FIG. 2 in a vertical direction.
Figure 6:
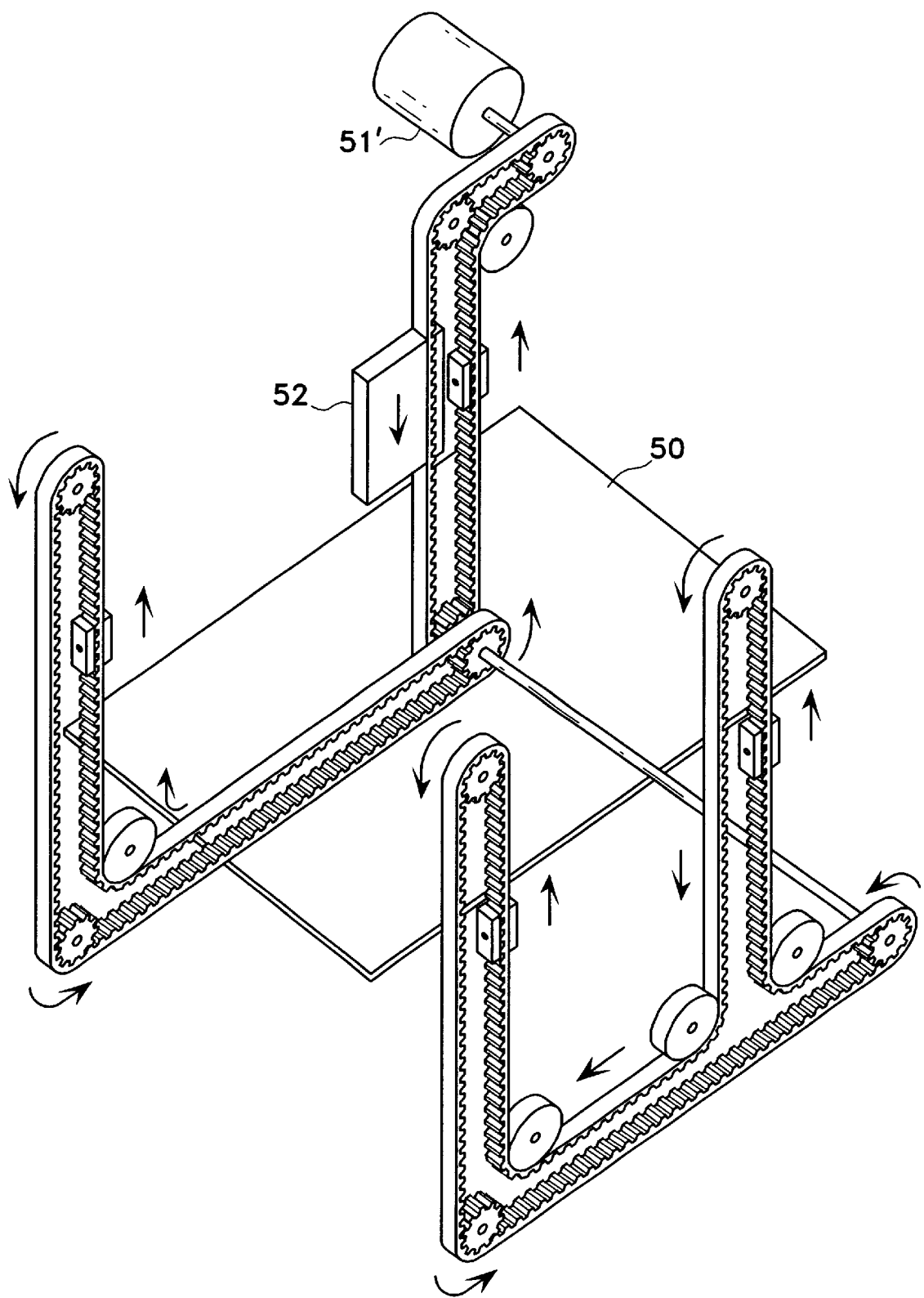
FIG. 6 is a perspective view of a second embodiment of drive mechanism for moving the drive mechanism of FIG. 2 in a vertical direction.

FIGS. 5 and 6 show two possible drive mechanisms which can be used to effect vertical movement of the drive mechanism shown in FIG. 2, i.e. in the "Z"-direction, the drive mechanism of FIG. 2 being attached to a platform 50 which is itself attached to series of toothed drive belts which can be driven by motors 51, 51'. A counter balance weight 52 serves in each case to reduce the loading on the "Z"-direction drive mechanism.

When more than one layer of magazines is used within the apparatus there is also the possibility of having a second layer of drives into which the cartridges can be fed for reading and recording data. However, more than one layer of magazines can merely be used to provide a greater storage capacity for the two drives shown in FIG. 1.

In addition to feeding cartridges into the two drives 5 and 6, the picker device 20 can also feed cartridges into the shuttle slot 7 so that cartridges can thereby be moved from one level in a rack to another. Other levels in the rack preferably consist of substantially similar apparatus to that described with reference to FIG. 1, and appropriate signals can be passed from one level to another to enable the respective control electronics to maintain an inventory of cartridges within a single level or even within a plurality of levels. The number of levels can be two or more, for example three, four or even five, with the result that the apparatus can access two, four, six, eight or even ten magazines.

Figure 7:
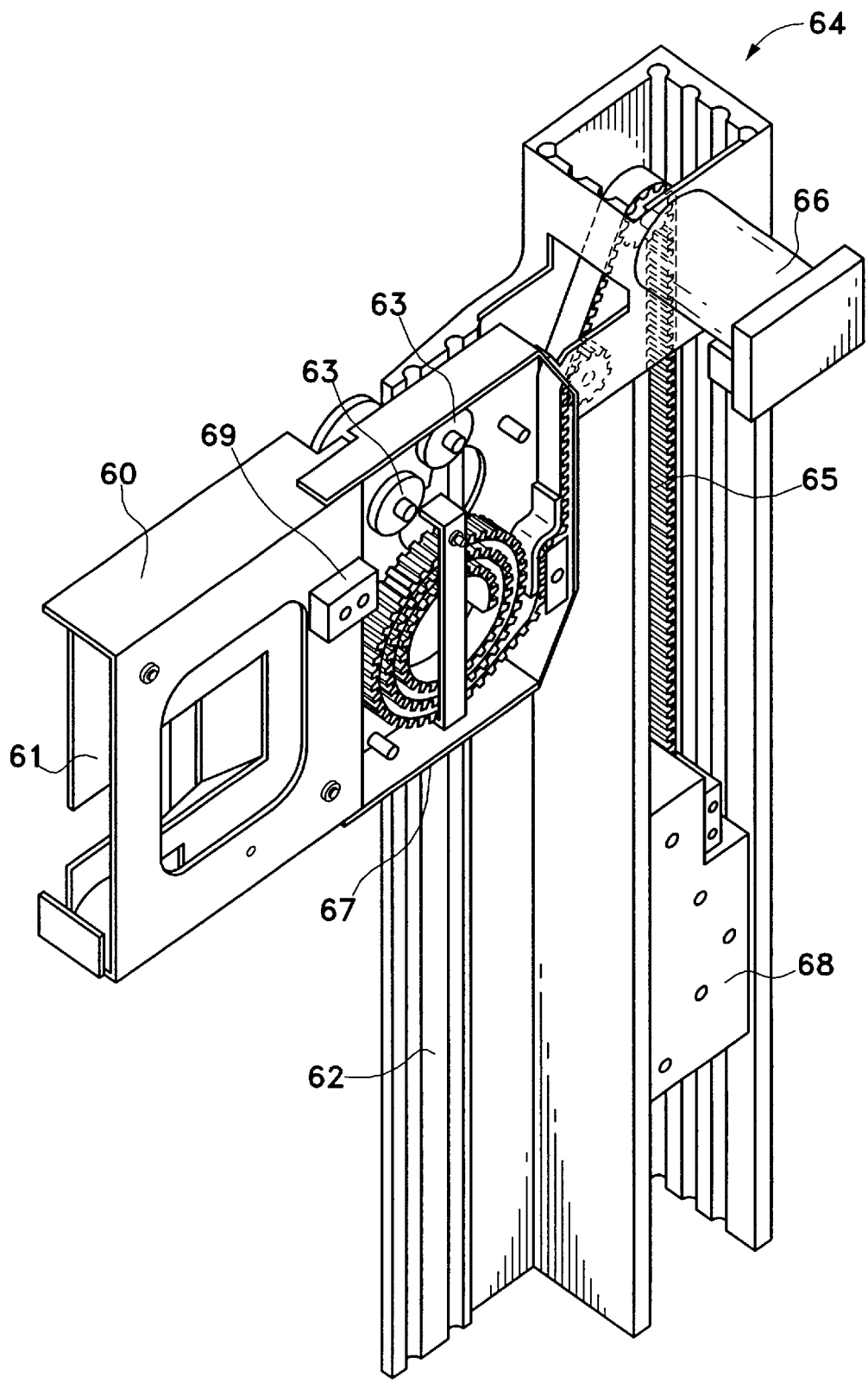
FIG. 7 is a perspective view of a transport mechanism for feeding cartridges between individual apparatus as shown in FIGS. 1 to 6.

FIG. 7 shows a drive mechanism for passing cartridges between adjacent apparatus of the type shown with reference to FIGS. 1 to 6.

The mechanism shown in FIG. 7 is located vertically within the shuttle slots 7 of adjacent apparatus of the type shown with reference to FIGS. 1 to 6, and it consists of a shuttle body 60 having a cartridge slot 61 for receiving a cartridge from the device 20, a vertical guide track 62 with an associated guide mechanism 63 for guiding the shuttle body 60 in a vertical plane between apparatus at different levels within a rack, and a drive mechanism 64 for moving the shuttle body 60 up and down the track 62.

The drive mechanism 64 consists of a toothed belt 65 which passes over a sprocket which can be driven by a motor 66. One end of the belt 65 is secured within a casing 67 for the guide mechanism 63, and the other end is attached to a counterweight 68. The position of the casing 67 on the belt 65 relative to the counterweight 68 is adjusted by clamping the belt 65 within the casing 67, the free end portion of the belt 65 being wound up within the casing 67.

A permanent magnet 69 attached to the casing 67 serves to actuate sensors in the respective sets of apparatus at different levels within the rack, thereby enabling associated control circuitry to monitor the location of the shuttle body 60 within the various levels within a rack, and thereby enable the picker device 20 to insert a cartridge into the cartridge slot 61 when the shuttle body is positioned at the correct level.

The shuttle arrangement shown in FIG. 7 enables a number of individual data storage units as shown in FIG. 1 designed for rack mounting use on their own to be stacked one above the other and to share cartridges between each other. Furthermore, racks for the purpose can be constructed with the shuttle arrangement in place for more than one data storage unit, additional units merely being slid into the rack so that shuttle slot 7 of unit becomes positioned around the shuttle arrangement shown in FIG. 7. In addition, racks can be placed one on another so that a single shuttle arrangement can be used to exchange cartridges between these racks.

When the above units are first powered up, they enter an initializing phase in which a check is made by the control electronics on the board 4 to establish that the slots for magazines are occupied and correctly positioned, and to move the picker device 20 into a known position in the "X", "Y" and "Z" directions relative to the magazines 9 and 10, and to the drives 5 and 6. Thereafter, the picker device 20 is moved relative to the magazines 9 and 10 so that the bar code reader 45 can proviede information to a controlling computer as to which position individual data storage media are in within the units.

At that stage the library is ready to read from or write to one or more of the data storage media within the data storage units.

What is claimed is:

1. Data storage units for storing a plurality of individual data storage media, the units comprising at least one magazine insertable into and removable from the front of the units and within which in use the individual data storage media are stored vertically and substantially perpendicularly to the direction of insertion of the magazine into the units and substantially parallel to the front of the units;

at least one drive means for reading data from or writing data to individual data storage media with said media substantially vertical, the drive means being positioned relative to the magazine so that the storage media are fed therein and removed therefrom in a substantially vertical plane and in a direction substantially perpendicular to the direction in which the media are removed from the magazine; and selector means for selectively removing media from the magazine in which they are stored, and feeding them into the drive means.

2. Data storage units according to claim 1, including a pair of removable magazines which are substantially parallel to each other and are removable from the front of the units, the selector means being able to selectively remove data storage media from the respective magazines and feed them into the drive means, said feeding being in a substantially vertical plane and in a direction substantially perpendicular to the direction in which the media are removed from the respective magazines.

3. data storage units according to claim 2, wherein removal of individual data storage media from either magazine by the selector means is with the media in a substantially vertical plane and in a direction substantially towards the other of said pair of magazines.

4. Data storage units according to claim 1, including two pairs of removable magazines, one pair of magazines being in a first substantially horizontal plane and the other pair of magazines being in a second substantially horizontal plane, each magazine of the respective pairs being substantially directly above one of the magazines of the other pair, the selector means being operable to select individual media from or feed individual media to the respective layers and into the drive means.

5. Data storage units according to claim 1, including ten removable magazines arranged in five pairs stacked one above the other in five substantially horizontal planes, the selector means being operable to select individual media from or feed individual media to the respective layers and into the drive means.

6. Data storage units according to claim 1, wherein the drive means are removable from the rear of the units.

7. Data storage units according to claim 1, including two drives for reading data from or writing data to the data storage media in each pair of magazines.

8. Data storage units according to claim 1, wherein the magazines are identical and interchangeable between different positions within the units.

9. Data storage units according to claim 1, wherein the selector means includes a reader for reading identifying indicia on individual data storage media.

10. Data storage units according to claim 9, wherein the magazines include indicia indicative of an empty storage position therein.

11. Data storage units according to claim 1, including control electronics for controlling movement of the selector means.

12. An electronic library comprising at least one data storage unit under the control of a computer, comprising:

data storage units for storing a plurality of individual data storage media, the units comprising at least one magazine insertable into and removable from the front of the units and within which in use the individual data storage media are stored vertically and substantially perpendicularly to the direction of insertion of the magazine into the units and substantially parallel to the front of the units;

at least one drive means for reading data from or writing data to individual data storage media with said media substantially vertical, the drive means being positioned relative to the magazine so that the storage media are fed therein and removed therefrom in a substantially vertical plane and in a direction substantially perpendicular to the direction in which the media are removed from the magazine; and selector means for selectively removing media from the magazine in which they are stored, and feeding them into the drive means.

13. A library according to claim 12, including at least two data storage units according to claim 1 and shuttle means for transporting individual data storage media between one unit and another.

* * * * *